United States Patent
Gimeno Verdejo et al.

(10) Patent No.: US 8,297,629 B2
(45) Date of Patent: Oct. 30, 2012

(54) STACKABLE SHOPPING BASKET

(75) Inventors: Isabel Gimeno Verdejo, Saragossa (ES); Jose Antonio Puertolas Salanova, Saragossa (ES)

(73) Assignee: Araven, S.L. (ES)

( * ) Notice: Subject to any disclaimer, the term of this patent is extended or adjusted under 35 U.S.C. 154(b) by 417 days.

(21) Appl. No.: 12/526,504

(22) PCT Filed: Feb. 8, 2008

(86) PCT No.: PCT/EP2008/051559
§ 371 (c)(1),
(2), (4) Date: Dec. 21, 2009

(87) PCT Pub. No.: WO2008/096003
PCT Pub. Date: Aug. 14, 2008

(65) Prior Publication Data
US 2010/0230916 A1   Sep. 16, 2010

(30) Foreign Application Priority Data
Feb. 9, 2007 (ES) .................................. 200700359

(51) Int. Cl.
*B62D 39/00* (2006.01)

(52) U.S. Cl. .................. 280/33.998; 280/47.26; D32/37

(58) Field of Classification Search .................. D23/37; 280/33.998, 47.26, 652, 655, 655.1, 47.315; D32/37
See application file for complete search history.

(56) References Cited

U.S. PATENT DOCUMENTS

| | | | | |
|---|---|---|---|---|
| 3,366,397 A * | 1/1968 | Zeilstra et al. | ............. | 280/47.26 |
| 4,185,848 A * | 1/1980 | Holtz | ............................ | 280/652 |
| 4,339,141 A | 7/1982 | Thiboutot | | |
| 5,145,082 A | 9/1992 | Craft | | |
| 6,036,204 A * | 3/2000 | Craft et al. | ............... | 280/47.315 |
| D438,010 S | 2/2001 | Drury | | |
| 6,390,495 B1 | 5/2002 | Cates | | |
| 6,651,992 B1 * | 11/2003 | Smith, Sr. | .................. | 280/47.26 |
| 7,147,243 B2 * | 12/2006 | Kady | ............................ | 280/655 |
| D544,159 S * | 6/2007 | McCoy et al. | .................. | D32/37 |
| 7,431,312 B2 * | 10/2008 | Sebastian et al. | ........ | 280/33.998 |
| 7,494,136 B2 * | 2/2009 | Alves et al. | ............... | 280/33.998 |
| 2006/0103087 A1 * | 5/2006 | Alcala Sebastian | ....... | 280/47.26 |
| 2007/0187912 A1 * | 8/2007 | Taulman et al. | ........... | 280/47.26 |

FOREIGN PATENT DOCUMENTS

| | | |
|---|---|---|
| GB | 937523 | 9/1963 |
| WO | 2006/056627 | 6/2006 |

OTHER PUBLICATIONS

International Search Report, date of mailing report Feb. 11, 2009 for PCT/EP2008/051559.

* cited by examiner

*Primary Examiner* — Hau Phan
(74) *Attorney, Agent, or Firm* — Fulwider Patton LLP

(57) ABSTRACT

The invention relates to a shopping basket in self service stores and/or supermarkets, of the type of those which can be stacked and incorporate rolling means (5) at their base and a drive handle (4) for transporting them in an inclined manner on the floor in which said drive handle (4) is located on a plane different from the load application plane, and further having its corners reinforced by means of bends (3) defining a plane (6) on which the side branches (7) of said handle (4) slide with the aid of guide means.

12 Claims, 6 Drawing Sheets

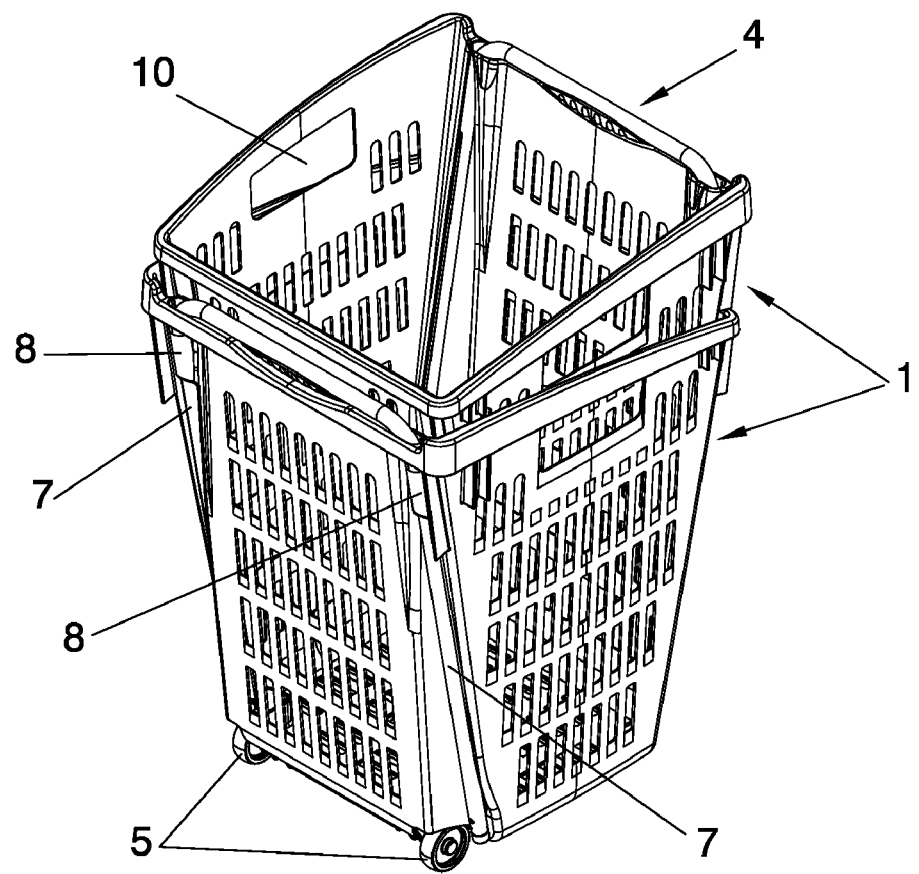
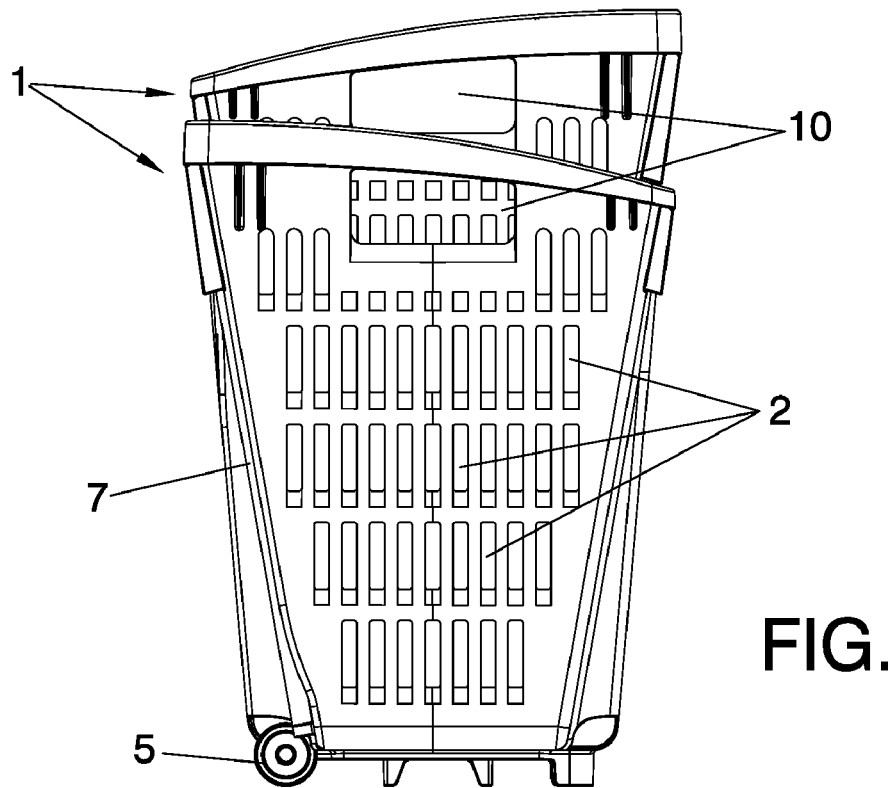
FIG. 6

STACKABLE SHOPPING BASKET

CROSS-REFERENCE TO RELATED APPLICATIONS

This Application is the U.S. National Stage of International Application No. PCT/EP2008/051559, filed Feb. 8, 2008, which claims priority to Spanish Application No. P200700359, filed Feb. 9, 2007.

OBJECT OF THE INVENTION

The present invention relates to a large capacity basket for purchasing in self service stores and/or supermarkets, of the type of those incorporating rolling means at their base and a drive handle which allows the user to move such baskets in a comfortable manner.

More specifically, the object of the present invention is a basket the structure of which allows transporting a large number of items without this damaging its structure, therefore increasing its durability and reliability.

BACKGROUND OF THE INVENTION

There are different types of baskets on the market intended to be used in supermarkets or self service stores as means so that the clients transport the goods to the checkout counters in which payment is made.

These baskets are presented as an alternative to typical metal carts, which occasionally are not suitable, either because of the number of items which are to be purchased or because the characteristics of the establishment make the circulation of said carts impossible.

Thus, the baskets normally used generally consist of stackable resistant plastic containers which are provided with one or several handles allowing the user to transport them throughout the premises and introduce the items therein.

Finally baskets have appeared which, being equally stackable, further have wheels and a drive handle which allow moving such baskets easily, moving them over the floor of the establishment.

However, as a result of the appearance of the latter baskets and due to their easy transport as a result of the wheels, it is increasingly common for the users to demand them with larger capacity and therefore that they are used to transport a large number of goods, which has certain drawbacks.

These drawbacks, of a structural and/or strength character, appear due to the fact that said baskets are forced to carry out greater efforts and to support larger stresses often causing them to break.

This problem is especially intensified in those baskets which are moved in an inclined manner with regard to the floor, moving on the rolling means forming the pivot axis, and in which its drive handle is located on the same plane of the face on which the items are supported, this being the load plane.

More specifically, the baskets of this type are basically subjected to two types of stresses due to the load that they house in an operative situation. On one hand, the tensile stresses caused by dragging it, and on the other hand the bending stresses caused by the weight of the goods housed therein on the load plane, i.e. on the face on which said goods are supported.

Furthermore, these tensile and bending stresses not only damage the actual structure of the basket, but also the drive handle, and more especially in the case pointed out in which said handle is located on the load application plane, i.e. when the basket is of the type of those that are moved in an inclined manner with regard to the floor by means of wheels or the like.

These stresses thus cause a decrease in the useful life of the baskets, which as is obvious is detrimental to the quality of the product and therefore its profitability.

DESCRIPTION OF THE INVENTION

The shopping basket proposed by the present invention efficiently solves the previously mentioned drawbacks, because even though it has a size which allows carrying a large number of items, it has structural features providing it with the necessary tensile strength, which positively affects its durability, and in addition its profitability, all this without relinquishing its easy transport or the essential requirement of stackability.

To that end the basket of the invention comprises a series of features which on one hand provide it with greater structural strength and on the other hand allow reducing the stress caused by the forces involved as a result of the breakdown thereof.

More specifically, for achieving said objectives the basket of the invention is structured from a basket of the type of those that are moved in an inclined manner with regard to the floor as a result of rolling means forming the pivot axis of said basket, but in which the drive handle is located on a plane different from the load application plane.

Thus, for the specific case in which the drive handle is located on a plane different from the load application plane but parallel thereto and more specifically on a parallel plane moved towards the inside of the basket, an improvement of the modulus of strength of the handle is obtained due to the fact that the side branches of said handle and the points of the body of the basket which are furthest from said plane is less.

In other words, the modulus of strength can be defined as:

$$W = I/d$$

wherein I is the moment of inertia of the section of the handle with regard to the bending axis and d the distance to the barycenter.

Therefore, by decreasing the distance d of the handle to the barycenter or center of gravity, the modulus of strength, or in other words, the strength of the assembly is increased.

In addition, for the case in which the drive handle is located on a plane different from the load application plane and inclined with regard thereto, what is achieved is that the forces generated by the load, causing the bending, are broken down into two components, only one of which generates bending since it is orthogonal to the plane of the handle, said component being in any case less than the force that there would be if the handle was located on a plane coinciding with the load plane defined by the face of the basket on which the items are supported upon inclining said basket for its transport.

In other words, Q being the load, it will be broken down into:

$$\vec{Q} = \vec{qx} + \vec{qy}$$

wherein qx does not generate a bending moment as it is aligned with the plane of the handle, therefore for tensions generated by bending moments, it can be assumed that the load will be $=qy$ wherein $qy = Q \cos \alpha$, α being the inclination angle between the plane of the handle and the load plane; from which it is deduced that said component qy will always be less than Q.

However, for the case in which the plane of the handle and the load plane were coincident and therefore a $\alpha=0$, it can be stated that $\cos \alpha = \cos 0° = 1$, therefore qy=Q, i.e. the entire load Q would generate a bending moment.

In addition, for improving the strength of the basket even more, such basket can have corners reinforced by means of folds or bends carried out therein.

These bends provide the basket with a greater structural rigidity and strength since on one hand it involves an extra contribution of material to the bending plane in those baskets which are moved in an inclined manner, and therefore an improvement of the modulus of strength.

On the other hand said bends allow the distribution of stresses generated by the load on several orthogonal planes, which favors the distribution of stresses.

DESCRIPTION OF THE DRAWINGS

To complement the description being made and for the purpose of aiding to better understand the features of the invention according to a preferred practical embodiment thereof, a set of drawings is attached as an integral part of said specification, in which the following has been shown with an illustrative and non-limiting character:

FIG. 6 shows a perspective view and an elevational view of several baskets according to the present invention in a stacking position.

PREFERRED EMBODIMENT OF THE INVENTION

In view of the figures indicated, it can be observed how the stackable basket of the invention is basically structured from a body (1) with a prismatic shape or the like, the edges of which are generally rounded and having a series of cavities (2).

The basket of the invention likewise has a drive handle (4) that is extractible, telescopic or the like, and rolling means (5), such as wheels for example, such that it is inclined with regard to the floor when it is moved as a result of said rolling means (5), which form the pivot axis of said basket.

Figure 2:
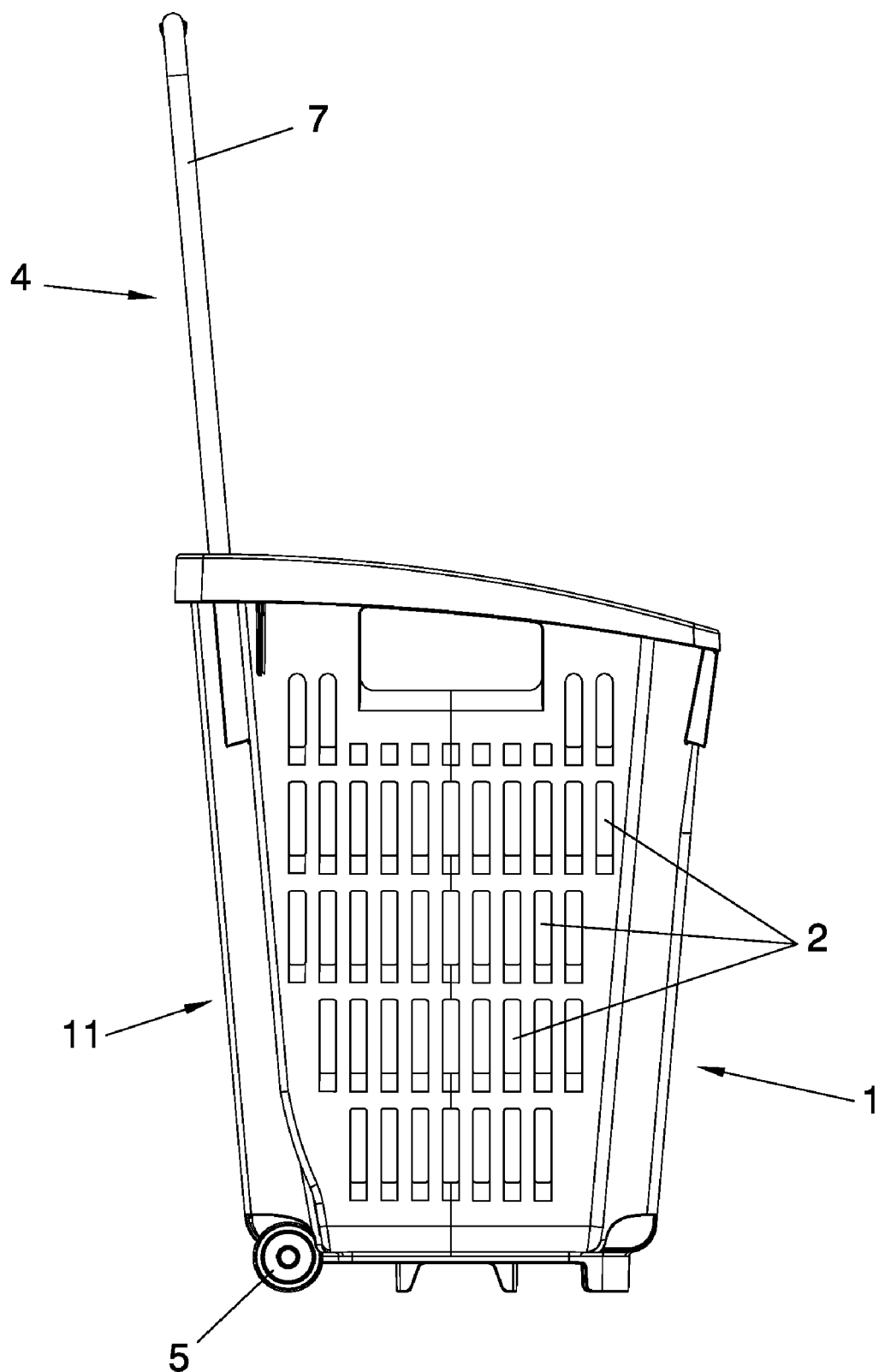
FIG. 2 shows an elevational view of another possible embodiment of the invention in which the drive handle is located on a plane parallel to the load plane.

According to a possible embodiment of the invention, and as can be seen in FIG. 2, the drive handle (4) is located on a plane different from the load application plane, i.e. on a plane different from the plane defining the face (11) on which the items are supported when the basket is moved in an inclined manner. More specifically, the drive handle (4) is located on a plane parallel to the load plane and moved towards the inside of the basket, an improvement of the modulus of strength of said handle (4) thus being obtained.

Figure 1:
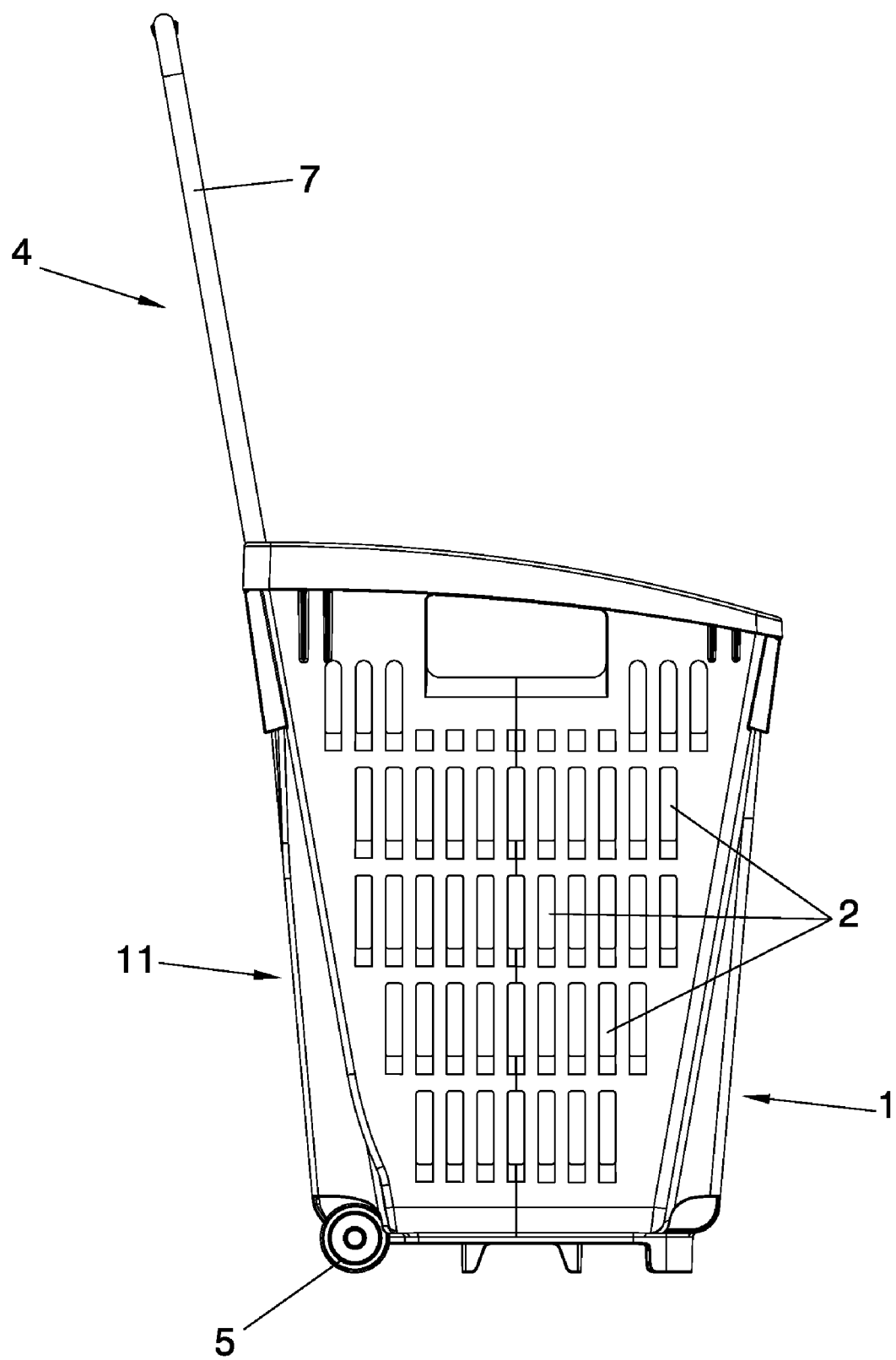
FIG. 1 shows an elevational view of a possible embodiment of the invention in which the drive handle is located on an oblique plane with regard to the load plane.
Figure 5:
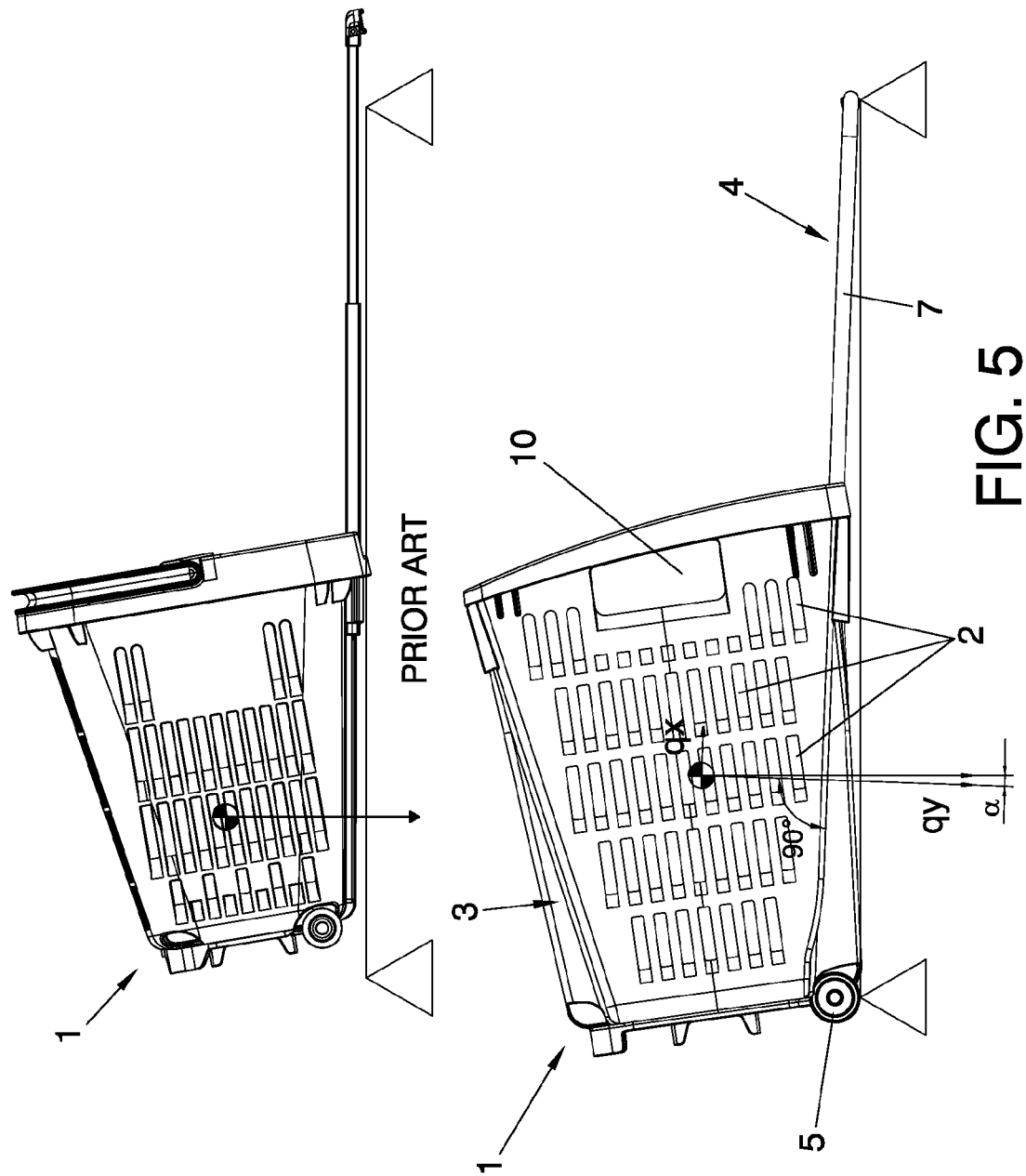
FIG. 5 shows two elevational views, one of the preferred embodiment of the previous figure and another of the prior state of the art, both in a horizontal position on the face incorporating the drive handle.

In addition, according to another possible embodiment of the invention, and as can be seen in FIG. 1, the drive handle (4) is located on a plane that is also different from the load application plane, but also inclined with regard thereto, whereby achieving that the forces generated by the load causing the bending are separated into components, the result of which is less than there would be if the handle was located on a plane coinciding with the load plane defined by the face (11) of the basket on which the items are supported upon inclining said basket for carrying them, as can be observed in FIG. 5, in which the distribution of said forces on a basket from the prior state of the art and in another one according to this embodiment has been depicted.

In addition, and according to another possible embodiment, the basket of the invention can incorporate corners reinforced by means of bends (3), as can be seen in the figures, located at least in the corners of the face defining the load plane.

Thus, for the case of the basket the drive handle (4) of which is located on a plane parallel to the load plane and moved towards the inside of the basket, the bends (3) will have a shape such that they define a plane (6) (not depicted) parallel to the plane of the handle such that the side branches (7) of said handle (4) slide on said plane (6) with the aid of guide means.

Figure 3:
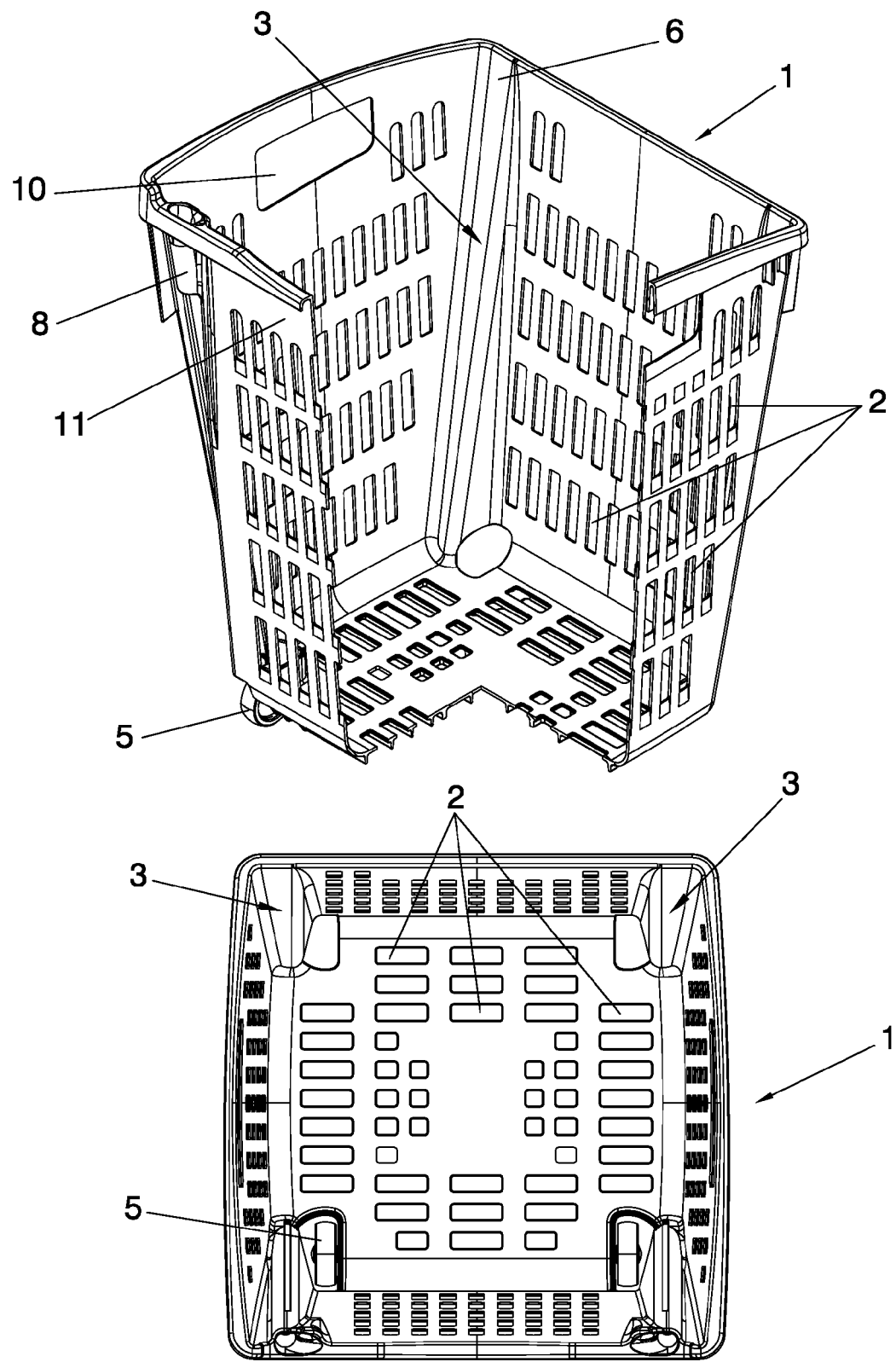
FIG. 3 shows a plan view and another perspective sectioned view of a possible embodiment of the basket of the invention in which the bends forming the reinforcement of one of the corners can be observed.
Figure 4:
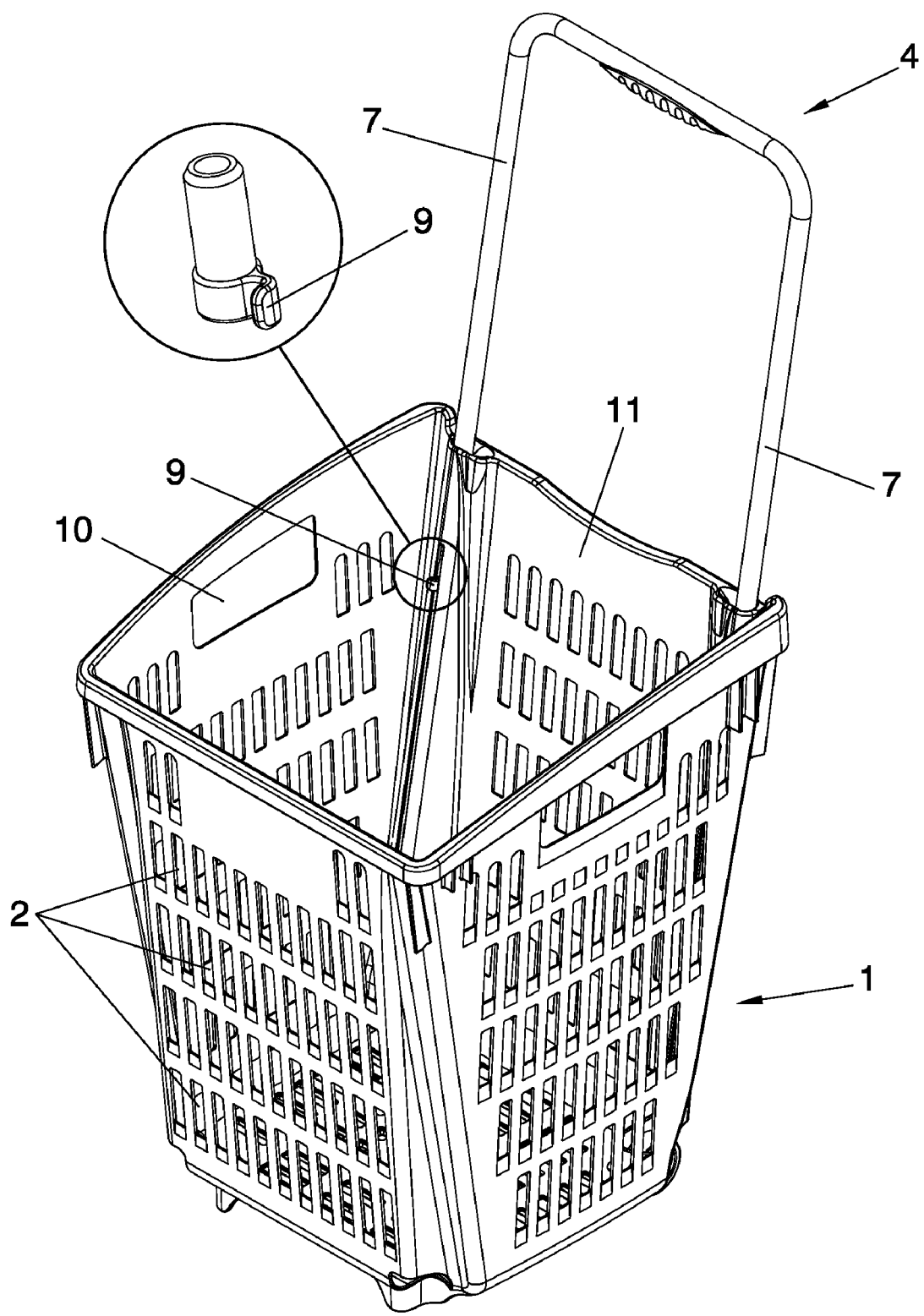
FIG. 4 shows a perspective view of a preferred embodiment of the basket of the invention with the drive handle in an operative position.

In addition, for the case of the basket the drive handle (4) of which is located on a plane inclined with regard to the load plane, the bends (3) will have a shape such that they define a plane (6) inclined coinciding with the plane of the handle such that the side branches (7) of said handle (4) slide on said plane (6) with the aid of guide means, as can be seen in FIGS. 3 and 4.

According to a possible preferred embodiment of the invention, said guide means for guiding the side branches (7) of the handle (4) through the bends (3) will be formed by holes (8) through which said side branches (7) slide, said holes (8) being able to be inclined or not inclined according to each case.

Furthermore, as an element to improve said guiding along the entire run of the handle (4), this handle will be able to have, on at least one of the side branches (7) and preferably at its lower end, an element (9) having a protuberance which runs through a guide channel located for this purpose in the handle sliding area, either the actual wall of the basket or the bend (3), such that on one hand it guides the movement of said handle (4) and on the other hand said protuberance prevents the accidental extraction of the side branches (7) of said handle (4) both from the guide channel and from the corresponding holes (8).

The basket of the invention could also be reversibly stacked by simply adding the mentioned bends (3) in the symmetrical areas, i.e. adding them not only in the corners of the basket formed by the face defining the load plane but also in the rest, as can bee seen in FIG. 6, thus facilitating its collection and storage for the user.

Also according to another possible embodiment of the invention, the basket of the invention could have orifices (10) made in one or several of the side faces which by way of a handgrip would allow the user to carry the baskets without needing to use the drive handle (4), or for example in the event that a set of stackable baskets are to be moved.

Finally, for facilitating the introduction and recovery of the goods for the user, the face of the basket opposite that forming the load plane will be shorter than the rest, thus defining an opening as can be seen in FIGS. 4, 5 and 6.

The invention claimed is:

1. A stackable shopping basket for use in a self-service store or supermarket comprising, a tapered body having a plurality of vertical side faces and a base, the rearward face defining a load plane, a drive handle with side branches located adjacent the rearward face, and rolling means adjacent the base for its movement in an inclined manner with regard to the floor, the drive handle being located on a plane different from the load plane, the corners of the body extending vertically along the rearward face being reinforced by means of inward bends that define a plane parallel to the plane of the handle on which the side branches of said handle slide, and the corners of the body extending vertically along the forward face being reinforced by bends of similar shape, wherein the basket is nestable with a like basket in a first and a second position, the first position being one in which the rearward faces of the baskets are proximate to each other, the second position being one in which the rearward faces of the baskets are distal to each other.

2. A stackable shopping basket according to claim 1, wherein the drive handle is located on a plane parallel to the load plane moved towards the inside of the basket.

3. A stackable shopping basket according to claim 1, wherein the drive handle is located on a inclined plane with respect to the load plane.

4. A stackable shopping basket according to any one of the previous claims, further comprising guide means for the side branches of the handle.

5. A stackable shopping basket according to claim 4, wherein the guide means comprise holes through which said side branches slide.

6. A stackable shopping basket according to claim 4, wherein the guide means comprise an element with a protuberance located at the lower end of at least one of the side branches of the handle in which said protuberance runs through a guide channel.

7. A stackable shopping basket according to claim 6, wherein the protuberance is of a shape such that it prevents the accidental extraction of the side branches of said handle both from the guide channel and from the holes.

8. A stackable shopping basket according to claim 5, wherein the guide means comprise an element with a protuberance located at the lower end of at least one of the side branches of the handle in which said protuberance runs through a guide channel.

9. A stackable shopping basket according to claim 8, wherein the protuberance is of a shape such that it prevents the accidental extraction of the side branches of said handle both from the guide channel and from the holes.

10. A stackable shopping basket according to claim 1, further comprising orifices made in one or several of the side faces to provide a handgrip.

11. A stackable shopping basket according to claim 1, wherein the forward face of the basket opposite to that forming the load plane is shorter than the rearward face so as to define an opening in the top of the basket.

12. A stackable shopping basket according to claim 1, wherein the drive handle is extractible or telescopic.

\* \* \* \* \*